United States Patent [19]
Hollywood et al.

[11] Patent Number: 5,793,845
[45] Date of Patent: Aug. 11, 1998

[54] SERVICE NODE FOR A TELEPHONY NETWORK

[75] Inventors: Steven Hollywood; John Johnston, both of Ipswich, England

[73] Assignee: British Telecommunications public limited company, London, England

[21] Appl. No.: 320,985

[22] Filed: Oct. 11, 1994

[30] Foreign Application Priority Data

Aug. 1, 1994 [EP] European Pat. Off. ............ 94305682

[51] Int. Cl.⁶ .................................................. H04M 1/64
[52] U.S. Cl. .................... 379/88; 379/283; 379/386; 379/269
[58] Field of Search ........................ 379/67, 88, 89, 379/269, 242, 243, 283, 386, 399

[56] References Cited

U.S. PATENT DOCUMENTS

| | | | |
|---|---|---|---|
| 4,791,664 | 12/1988 | Lutz et al. | 379/199 |
| 4,879,743 | 11/1989 | Burke et al. | 379/142 |
| 4,955,054 | 9/1990 | Boyd, Jr. et al. | 379/88 |
| 5,181,238 | 1/1993 | Medamana et al. | 379/95 |
| 5,355,403 | 10/1994 | Richardson, Jr. et al. | 379/88 |
| 5,479,498 | 12/1995 | Brandman et al. | 379/88 |

FOREIGN PATENT DOCUMENTS

0561026 A1  9/1993  European Pat. Off. .

OTHER PUBLICATIONS

Hall et al, "A New Element for Providing Intelligent Network Services", AT & T Technical Journal, vol. 70, No. ¾, 1991, Short Hills US, pp. 72–84, XP271089.

Murray, "Distributed Transaction Processing Aspects of the Intelligent Network", International Switching Symposium 1990, Session B8, Paper 4, vol. 5, 28 May 1990, Stockholm SE, pp. 153–158, XP130941.

Natarajan et al, "A Framework Architecture for Information Networks", IEEE Communications Magazine, vol. 30, No. 4, Apr. 1992, New York US, pp. 102–109, XP290769.

*Primary Examiner*—Fan Tsang
*Attorney, Agent, or Firm*—Nixon & Vanderhye P.C.

[57] ABSTRACT

A service node provides a shared added value service within a telephony network, such as a public switch telephone network. Peripheral devices, such as speech applications platforms shared announcement platforms and message recording platforms, are connected to a switch which operates under the control of a central control computer. The switch includes distributed processors responsive to externally originating signals, such as DTMF signals, generated while calls are being processed. The distributed processing devices supply information derived form said signals to the central control computer. Thus, it is no longer necessary for a central control computer to examine ongoing calls in order to detect the presence of DTMF signalling. Detection of DTMF signalling is performed locally and information is returned back to the control computer only when relevant information has been detected. In this way, the size of the switch may be increased relative to the size of the control computer and the level of bandwidth required between the control computer and the switch is significantly reduced.

31 Claims, 6 Drawing Sheets

SERVICE NODE FOR A TELEPHONY NETWORK

BACKGROUND OF THE INVENTION

1. Field of the Invention

The present invention relates to a service node connectable to a telephony network, in which a plurality of peripheral devices are provided, along with switching circuits for connecting said peripheral devices to external communication circuits under the control of control processing circuits.

2. Related Art

Over recent years, telephony networks have become more sophisticated and it has become possible for an increasing number of services to be provided, in addition to the fundamental provision of allowing a first customer to be connected to a second customer.

Telephony systems of this type are often referred to as intelligent networks, and provide such services as automatic call distribution, store and forward, fax to speech, call queuing, voice menu systems, call diversion, follow-on and voice prompts, etc.

Service nodes are units within the network where intelligent services are concentrated and made available to customers connected to the network via switching mechanisms provided within the network. At the node itself, a large switching device is provided which allows customer calls to be connected to peripheral devices under the control of central control processing means, such as a mini or mainframe computer. In known systems, it is necessary for the control computer to analyse signals generated by calling customers, in order that peripheral devices may be connected and, as necessary, disconnected etc. Thus, once a particular service has been established, this is generally driven under the control of a particular peripheral device. However, it is necessary for the central control computer to observe the operation of a connection between peripheral devices and external lines, in order to ensure that the integrity of the overall network is maintained.

A problem with known service nodes is that it is desirable to have large switches at the nodes, so that maximum benefit may be gained from a large number of shared services. However, as the number of shared services increases, with a resulting increase in the size of the connecting switch, the size and power of the control computer must also increase, along with the bandwidth of the communicating link between the computer and the switch.

SUMMARY OF THE INVENTION

According to a first aspect of the present invention, there is provided, in a telephony network, a service node comprising a plurality of peripheral devices; switching means for connecting said peripheral devices to external communication means and control processing means characterised in that the switching means includes distributed processing means responsive to externally originating signals, wherein said distributed processing means are arranged to supply information derived from said signals to the control processing means.

Thus, distributed processing means are provided within the switch itself such that, rather than supplying all signals derived from calling customers to the control processing means, information derived from said signals is supplied to the control processing means. In this way, for a given size of switch, demands made upon the control processing means are reduced and the degree of bandwidth between the control processing means and the switch is significantly reduced. For example, in the preferred embodiment, a central control computer communicates via a standard ethernet connection.

In a preferred embodiment, the distributed processing means includes a first type of processing means (which may be digital signal processors) arranged to produce an indication of detected signals; and a second type of processing means (which may be a microprocessor) arranged to receive indications from said first type of processing means.

Preferably, digital signal processors detect dual tone multifrequency signals and convert these into information in the form of digital representations of the conveyed codes. Furthermore, in a preferred embodiment, distributed microprocessors are arranged to compare said detected codes against predetermined pattern permutations, such that information is only supplied to the control processing means when a detected pattern has been matched against the predetermined pattern.

According to a second aspect of the invention, there is provided a method of recognising predetermined externally originating signals at a service node connected to a telephony network, comprising steps of defining a scan pattern on a control processing means and downloading said scan pattern to distributed processing means distributed in a switching means, wherein said distributed processing means supplies information indicating a match against received signals back to said control processing means.

BRIEF DESCRIPTION OF THE DRAWINGS

The invention will now be described by way of example only, with reference to the accompanying drawings, in which.

DETAILED DESCRIPTION OF EXEMPLARY EMBODIMENTS

Figure 1:
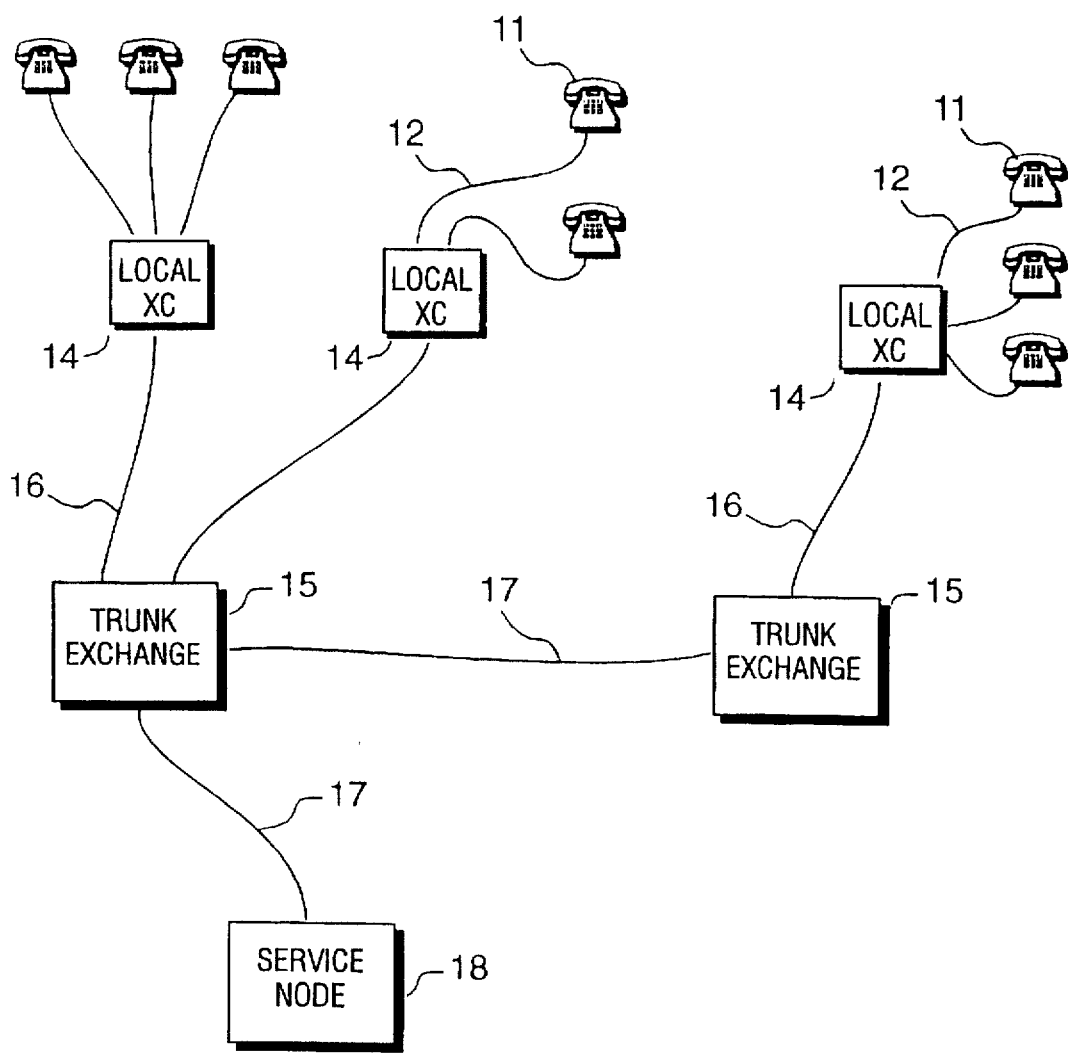
FIG. 1 shows a public switched telephony network, including a plurality of customer terminal equipment, local exchanges, trunk exchanges and a service node.

A telephony network is illustrated in FIG. 1, including a plurality of customer terminal equipment 11, including telephones and fax machines etc. Each customer terminal equipment 11 is connected via a local line 12 to a local exchange 14, thereby providing bi-directional communication between the terminal equipment and the local exchanges.

Local exchanges 14 are connected to trunk exchanges 15 and bi-directional communication between said exchanges is effected over trunk cables 16. Similarly, trunk exchanges are bi-directionally connected by trunk lines 17, again arranged to convey multiplexed signals.

In the preferred network, conversion between analogue signals and digital signals occurs at the local exchanges 14 and communication throughout the trunk network is performed in the digital domain. Thus, each trunk line 16 includes physical communication links each arranged to convey 30 speech channels over a 2 megabit per second multiplex. In addition, higher levels of multiplexing may be achieved using optical links, which are particularly suitable for connecting trunk exchanges 15.

In addition to allowing conventional telephone connections to be made, the network shown in FIG. 1 also includes a plurality of added value services which allow customers to interact via voice menus, receive recorded information from a central source, record messages and receive recorded messages, and establish sophisticated call diversion procedures, wherein, over a day, calls may be diverted to a plurality of numbers, reflecting the location of an actual customer, rather than the terminal equipment. These added value services are located at a central position, in the form of a service node 18. The service node 18 is connected to the rest of the network via a plurality of 2 megabit per second digital links, such that any customer connected to the network may obtain services via the central service node by establishing an appropriate connection through the network of exchanges.

Figure 2:
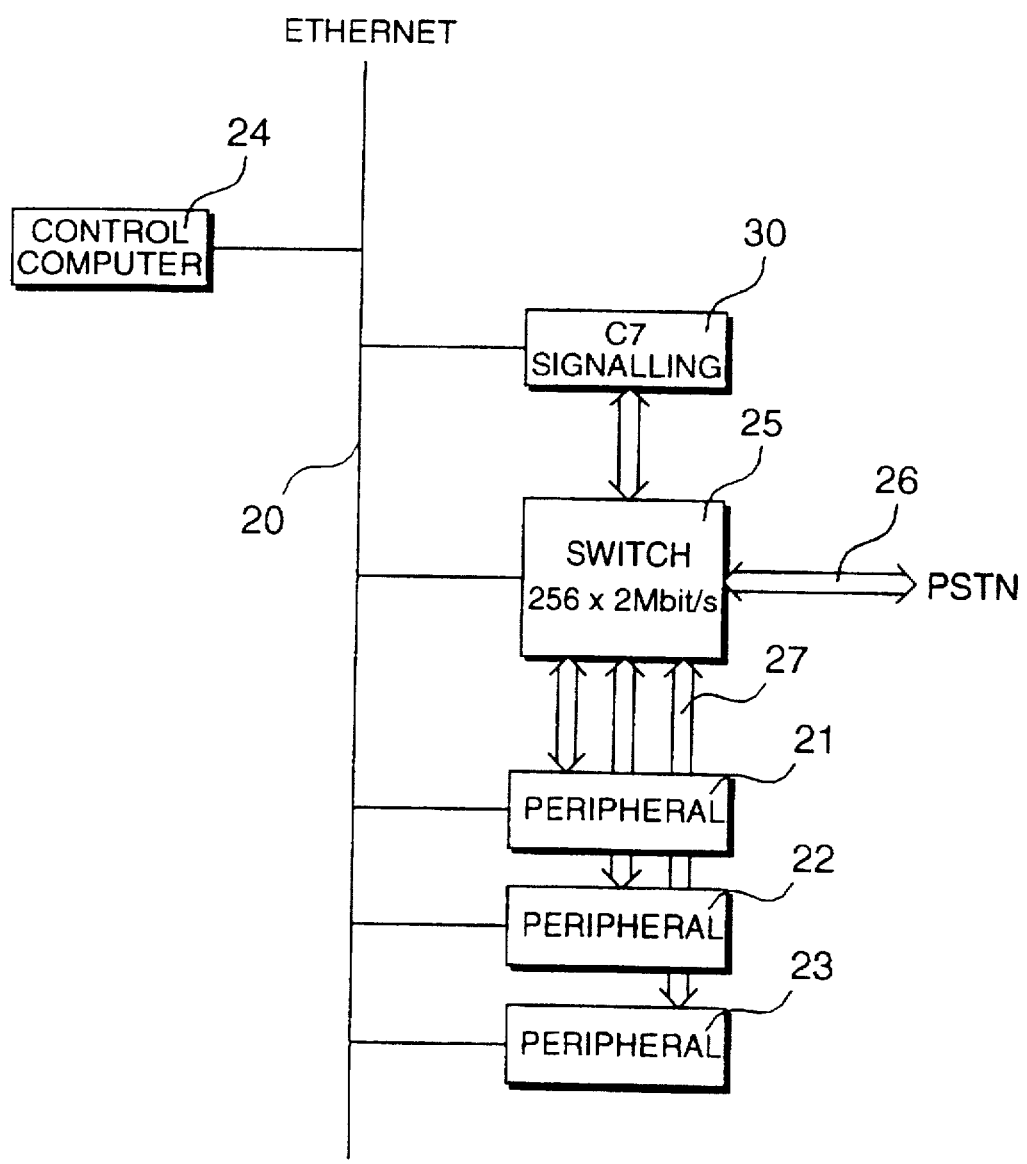
FIG. 2 shows the service node identified in FIG. 1, including a control computer, peripheral devices and a switch for connecting external lines to said peripheral devices.

The service node 18 is detailed in FIG. 2 and comprises a plurality of peripheral devices; three of which are identified by references 21, 22 and 23. Each peripheral device is configured to perform a specific task. Thus, voice menu services may be provided by a speech applications platform, allowing two-way communication using recorded voice messages, voice recognition and DTMF tone recognition.

Another peripheral device may be arranged to supply recorded information to calling customers. A message is recorded centrally on the peripheral and written to randomly accessible memory storage devices.

Thus, the same message may be played to a plurality of calling customers and by addressing the memory devices individually for each call, the message may be played to each calling customer from the beginning of the message, creating the impression that a dedicated message has been recorded for that call.

A third peripheral device may be arranged to record messages left by customers so that they may then be collected by a specific customer for whom the service has been created, effectively providing the customer with the services of a virtual call answering machine. Thus, on receiving instructions from the customer, all of said customers will be directed to the service node such that, under the control of a control computer 24, voice data will be supplied to, say, peripheral 23, whereafter, in response to a call made by the customer, said recorded information may be replayed.

Another service provided by service nodes is that of redirecting calls. Thus, all calls to a particular customer may be directed to the service node and, under the control of the control computer 24, the call is redirected out to a preprogrammed destination. Thus, for each day, a customer may issue programming commands, such that, at predefined points during the day, calls are directed to different numbers, thereby following a customer from location to location.

A switch 25 is provided with 256 multiplex lines. Thus, each of said lines includes two coaxial cables, for bi-directional communication, and each of said coaxial cables is capable of conveying 32 channels, transmitted at 2 megabit per second. Thus, a plurality of coaxial communications are provided to the public switch telephone network, identified generally by reference 26 and other 2 megabit links are supplied to each of the respective peripherals. Thus, in the example shown in FIG. 2, 2 megabit links 27 are connected to peripheral 21, similar links 28 connect peripheral 22, while links 29 connect peripheral 23. Thus, each peripheral 21 to 23 etc. is arranged to receive voice channels in the form of 2 megabit multiplex connections. In addition, the peripherals are arranged to receive control commands from the control computer 24.

Preferably, common channel signalling is used, such as signalling which conforms to the CCITT C7 recommendation and an interface for identifying and generating C7 signalling information is identified in FIG. 2 by reference 30.

The C7 interface 30, the central switch 25, the peripheral devices 21, 22 and 23 communicate with the control computer 24 via an ethernet connection, capable of conveying a data at a burst rate of up to ten megabits a second.

Calls are initiated in response to DTMF tones generated by a customer. In order to establish a call to the service node, signalling commands are transmitted over the common channel, by means of one of the channels forming part of those generally identified by reference 26, which, at switch 25, are directed to the signalling interface 30. The signalling interface 30 instructs the control computer 24, over the ethernet 20, to the effect that a calling customer requires service. The signalling information will identify to the control computer 24 an identification of the actual calling customer and, to some extent, an identification of the number called by said customer. Thus, on the basis of this information, the control computer 24 instructs the switch 25 to connect the call to a specified channel connected to the required peripheral device. In addition, the control computer 24 also instructs the relevant peripheral as to the nature of the service required.

While a customer is making use of a service, it is common practice for the customer to generate signals in a form which is recognisable by the system. These signals may be interpreted by peripheral devices as part of the normal operation of the service. However, in addition, it may also be necessary for customer generated signals to be recognised by the control computer 24, particularly if these relate to customer instructions which effectively terminate a service, such that the control computer is required to instruct switch 25 and the relevant peripheral to the effect that the service has now been terminated and, if required, to allow the customer to make further use of the services available at the node.

In the telephony network illustrated in FIGS. 1 and 2, the service node includes a plurality of peripheral devices in addition to switch 25 for connecting the peripheral devices to external communicating channels 26. In order to establish calls and to monitor signalling while calls are in process, a significant level of processing capacity is required within the node. The service node is therefore provided with a control computer 24 which provides overall control of the system in an hierarchical manner. However, in addition to this, the switch 25 itself includes distributed processing devices which are themselves responsive to externally originating signals, such as DTMF signals generated by customers while calls are in process. Thus, the distributed processing devices are arranged to supply information derived from said signals to the control computer 24. Thus, in this way, it is not necessary for the control computer 24 to scan incoming calls in order to detect customer generated signalling. The detection and identification of signalling commands is made locally at the switch 25 and data is only supplied to the control computer 24 over the ethernet 20, when a customer originating signal has been detected. Thus, the switch 25 includes local processing devices responsive to external signals, such that information derived from said signals may be supplied to the control computer 24, in preference to the signals themselves. Thus, the computer 24 is relieved of the activity of scanning customer originated calls, which provides two significant benefits. Firstly, for a given switch size, less processing capacity is required on the part of the control computer 24. Alternatively, for a given processing capacity present on the control computer 24 a much larger switch may be used. The advantage of that is, for a given size of control computer 24, more central added value services may be included at the node, thereby effectively providing a greater economy of scale. Secondly, given that it is not necessary for scanning to be effected by the control computer 24, communication between the switch 25 and the control computer 24 is significantly reduced. Consequently, far less band width is required on the part of communication channels connecting control computer 24 and the switch 25 which, in this example, is effected by means of an ethernet. Thus, as can readily be appreciated, the level of band width available on the ethernet is significantly less than the level of band width employed to effect communication between the PSTN and the peripheral devices, via the switch 25.

Switch 25 is housed within an EMC 19" shielded rack, which stands 2 metres high and contains a total of seven shelves. One of these shelves is used to house power supply units for the ethernet transceivers, while the remaining six shelves are provided for component cards of the switch itself.

Within the switch 25 two types of shelves are provided which are identified as line interface shelves and switching matrix shelves. In the preferred embodiment, switching matrix shelves and interface line shelves are duplicated so as to enhance reliability and a robust control computer, itself having duplicated shelves, preferably connected to the system, again enhancing overall reliability such that operation of the system is not dependent on a single card. Any of said cards may be removed while allowing the system to remain fully functional.

At the heart of the switch 25 is a non-blocking digital switching matrix configured from commercially available MITEL SMX/PAC chip sets. Switching matrix 32 receives 256 2 megabit per second coaxial pairs, conforming to the ST-BUS recommendation. Thus, each pair consists of a 32 channel multiplex for supplying information to the switching matrix 32 and a similar 32 channel multiplex for receiving information from said switching matrix 32. The switching matrix 32 is arranged such that any channel on any of said multiplexed lines may be switched to any other channel on any other of said multiplexed lines. Generally, said communications are bi-directional, such that first of said pair is arranged to transmit data from location A to location B while the other pair provides communication in the opposite direction, from location B to location A. Furthermore, of the thirty-two channel 2 Mbit/s multiplex, thirty of the channels are used to convey audio data, and of the remaining two channels, one is used to convey signalling data relating to the thirty audio channels, while the remaining channel is used to provide frame synchronisation so that the position of each of the channels within the time multiplex may be determined by channel switching circuitry.

Switching matrix 32 is controlled by an Intel 80286 microprocessor based system identified generally by reference 33. This microprocessor based system 33 is configured to control the switching matrix 32 in response to commands received over the ethernet line 20.

Signals transmitted through the switching matrix 32 conform to the ST-BUS recommendation and may be considered as 5 volt TTL compatible signals. Signals transmitted over lines 26 to the PSTN and other lines connected to the peripheral devices, do not conform to this recommendation and may effectively be considered as analogue-like signals, given the requirement for, in many situations, transmission over significant distances. Thus, before signals may be supplied to the switching matrix 32 and before signals emanating from said switching matrix may be supplied to the outside network, it is necessary to perform a conversion procedure, which is effected via line interface circuits.

Figure 3:
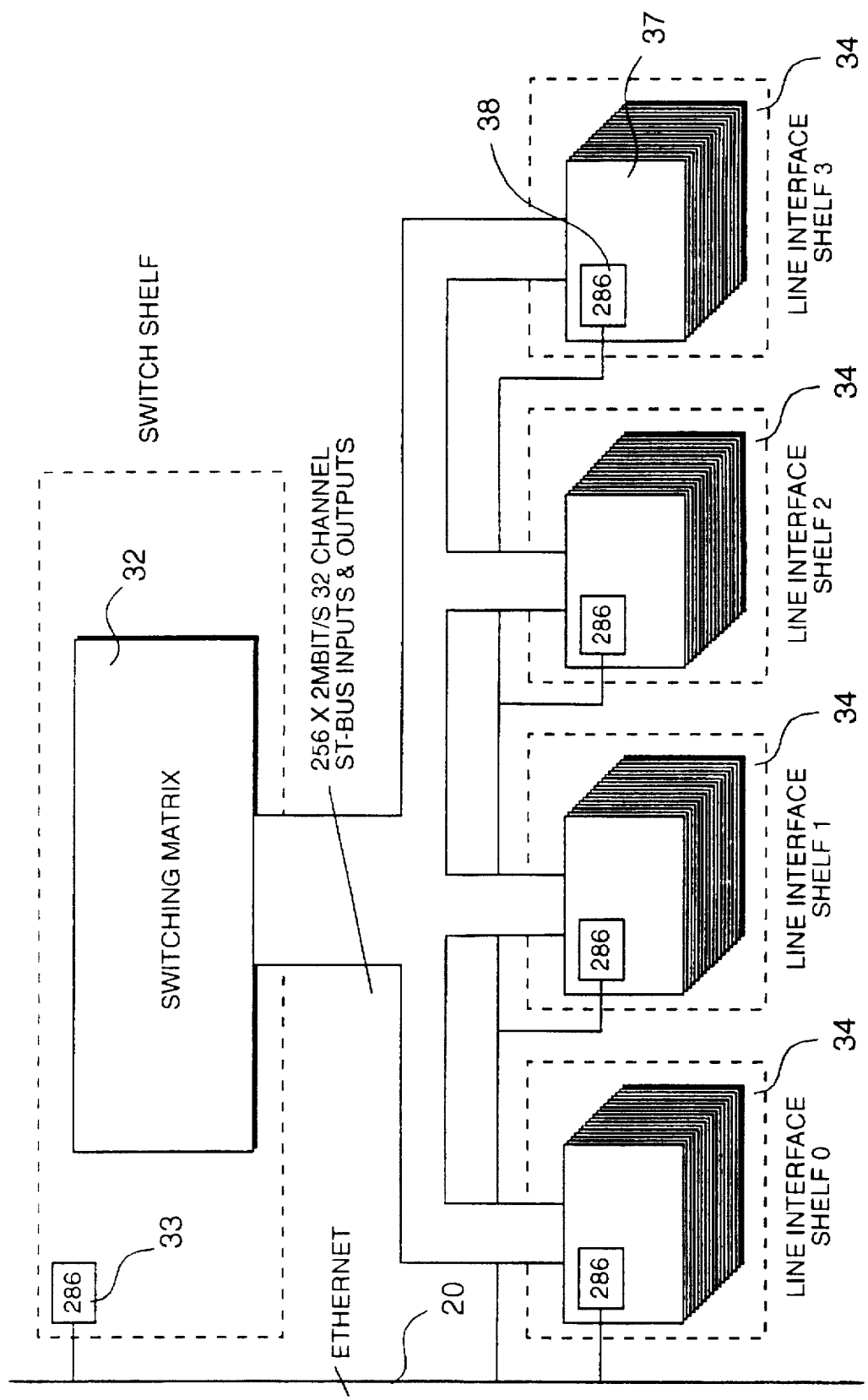
FIG. 3 details the switch shown in FIG. 2, including a switching matrix and a plurality of line interface cards.

The rack contains four line interface shelves identified in FIG. 3 by reference 34. Each line interface shelf may have a total of 16 line interface cards 37 and on each line interface card there is provided a resident Intel 80286 microprocessor system 38 and four bi-directional line interface circuits. Thus, within the four line interface shelves there is capacity for 256 bi-directional interface circuits.

In this example, customer originating signalling effected while calls are connected take the form of DTMF codes. Each DTMF code (dual tone multi-frequency) consists of two simultaneous tones, each selected from a different set of four possible tones. Thus, there are 4 ×4 permutations of two tones, providing a total of 16 different codes which the system may recognise. However, other modes of signalling may be employed consisting of audible signals of some form which may be detected by the system.

DTMF detection occurs on each line interface card under the control of the resident 286 computer system 38.

The nature of a particular DTMF detection will depend on the actual application being made during a particular call connection. The nature of DTMF codes required for particular applications are held by the control computer 24 and are accessible by systems operators. In addition to specific DTMF codes, it is possible to program the control computer 24 to detect simple logical combinations, such as ## followed by any of the numbers 1, 2 or 3 etc., as will be detailed subsequently. When a detection sequence of this type is required for a particular connection, it is necessary for the detection commands to be down-loaded to the respective line interface card. This is achieved over the ethernet 20 and, initially, high level detection codes are supplied from the control computer 24 to the 286 microprocessor system 33 resident within the switch shelf. Switch shelf microprocessor system 33 is responsible for identifying a particular line interface circuit and after receiving such information from the control computer 24 over the ethernet 20, the information is relayed to the respective 286 microprocessor system 38 resident on the respective line interface card. Thus, the transfer of DTMF detection programming from the control computer 24 to a line interface card 37 occurs in two steps, firstly from the control computer 24 to the switch shelf microprocessor system 33 and secondly from the shelf cell processor 33 to the respective line interface card microprocessor system 38. Thus, although it is possible for the control computer 24 to communicate directly with the line interface shelves, this is not done in practice as a hierarchical software structure exists whereby the control computer 24 communicates with the switch shelf microprocessor system 33, and the switch shelf microprocessor system 33 communicates with line interface card microprocessor system 38. Thus as far as the control computer 24 is concerned all transfers to the switch 25 may be considered as transfers to the switch shelf microprocessor system 33, thereby simplifying the way in which control computer 24 communicates with the switch 25.

Figure 4:
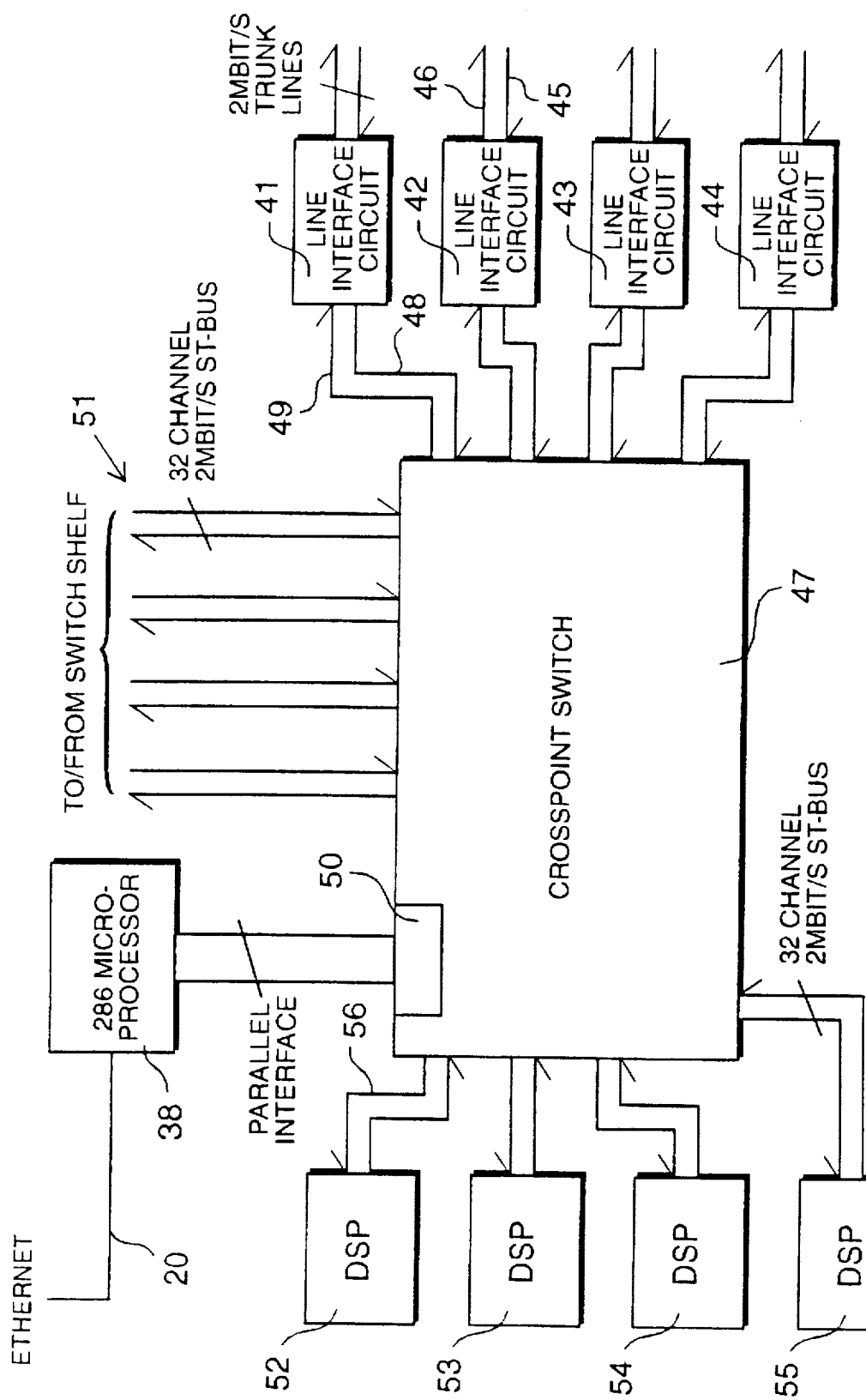
FIG. 4 details a line interface card shown in FIG. 3, including line interface circuits, digital signal processors and a cross point switch for connecting line interface circuits to digital signal processors.

A line interface card 37 is detailed in FIG. 4. The card includes 4 interface circuits 41, 42, 43 and 44, each connected to an input 2 megabit per second trunk line 45 and to an output 2 megabit per second trunk line 46. The line interface circuits are responsible for converting between transmission compatible signals and 32 channel 2 megabit per second ST-BUS signals which are supplied to and received from a cross point switch 47, via 2 megabit per second input lines 48 and 2 megabit per second output lines 49.

The cross point switch 47 consists of a Mitel SMX/PAC switch, similar to switching chips employed within the main switching matrix 32. However, it should be appreciated that the cross point switch 47 does not effect switching on a call-by-call basis. The cross point switch 47 is permanently configured during normal operation although said configuration may be modified to take account of upgrades and reconfigurations etc.

As shown in FIG. 3, the line interface board 37 includes a 286 microprocessor based system 38, connected to the ethernet link 20. The address and data bus of the microprocessor system 38 is connected to the configuration interface 39 of the cross point switch, such that said cross point switch 47 is configured in response to configuration data supplied from the microprocessor based system 38, as is known in the art. Thus, in response to this configuration, each ST-BUS output and input line (48, 49) is connected to similar lines 51 on the switch shelf side of the cross point switch 47. Thus, during normal operation, each channel supplied on an output line 48 from the line interface circuit from the cross point switch, will be switched to a particular channel on a particular multiplex of the ST-BUS on the switching matrix side of the cross point switch. Similarly, a parallel return path will be provided through the cross point switch, thereby allowing all calls to be directed through line interface circuits, via cross point switches resident on line interface cards, out to the main switching matrix 32 and then back to any selected line interface card via a further cross point switch based on said interface card and out of the main switch 25 via a predetermined line interface circuit.

In addition to providing configuration codes for the cross point switch 47, the 286 microprocessor based system 38 is also capable of observing any communication channel being passed through the cross point switch 47 by applying suitable address codes to the address bus connected to interface 50.

In addition to connecting interface circuit side channels to switch shelf side channels, the cross point switch 47 may also connect each input line 48 from the line interface circuits 41 to 44 to a respective digital signal processor 52, 53, 54 and 55. Thus, the cross point switch 47 may be configured such that the input multiplex 48 from line interface circuit 41 is connected to an output multiplex 56 supplied to a digital signal processor 52, with similar connections being made to the other three signal processors.

Each digital signal processor 51 to 55 is a TMS320C31 device produced by Texas Instruments and is programmed to be able to detect DTMF codes on each of the 30 audio channels present on the 32 channel input multiplex 56.

It will be appreciated that signals conveyed through the cross point switch 47, along with signals conveyed through the main switching matrix 32, are conveyed in digital form. The 2 megabit per second ST-BUS is arranged to convey 32 time multiplexed channels. Thus, each channel has an identifiable time slot within each frame and during this time slot 8 bits of data may be transmitted. Thus, when transmitting conventional speech signals, each of these 8 bit words convey a digital representation of an audio sample.

The digital signal processors 52 to 55 receive information in the ST-BUS format and produce an output in similar format. However, the output from each DSP does not represent an audio signal but represents an indication of information contained within an audio signal; in particular, the presence and identification of DTMF tones. Thus, in the previously suggested configuration. DSP 52 examines 30 speech channels received via line interface circuit 41, while said channels are being supplied to the switching matrix 32 via the switch side communication buses 51. The digital signal processor 52 is programmed to effectively convert signals received in the time domain into frequency domain signals, and then to provide an indication when these frequency domain signals correspond to recognised DTMF tones. Thus, the digital signal processors produce outputs indicating the presence of DTMF codes.

A DTMF signal may take one of sixteen states, therefore four output bits are produced by a DSP for each audio channel in order to identify a particular DTMF detected code. In addition to this, a further bit is used to provide a valid code detected signal and the microprocessor 38 is arranged to examine these five bits of data provided by each DSP on each of the 30 channels examined by each DSP.

Thus, during communication, a customer using a channel supplied to line interface circuit 41 may depress a key resulting in a DTMF signal being supplied over this channel. The audio signal may convey audio information in addition to the DTMF code, but by implementing a fourier transform on each of the thirty audio channels supplied to each of the DSPs, it is possible to detect the presence of the recognisable DTMF tones and successfully return this information to the microprocessor system 38. Thus, when the DTMF tone code is generated, the DSP 52 detects the presence of this DTMF tone and returns the relevant four bit representation to the cross point switch 47 on a respective channel associated with the particular channel being supplied via the line interface circuit 41. The DSP generates the five bit DTMF recognition signal throughout the time that the DTMF tone is being recognised.

Generally a DTMF tone must be present over a period of time before it is considered valid by the system, so that spurious noise signals or speech cannot wrongly trigger recognition of a DTMF code. Thus the DSP 52 will pause after recognising a DTMF tone combination, for long enough to ensure that it has been deliberately intended. Thereafter the DSP 52 generates the five bit recognition code once for each corresponding audio sample, and supplies it to the cross point switch 47. Thus, when a tone is correctly recognised by a DSP, there will be a period of time during which the recognition signal is continuously generated. Within this time period the microprocessor 38 must interrogate the cross point switch to capture DTMF recognition signals as they occur in real time.

A successful recognition of a DTMF tone by a DSP will result in the five bit signal being generated for a minimum period of 32 milliseconds. Thus, in order to ensure successful capture of all recognised DTMF codes, the microprocessor must sample a DSP output channel once every 16 milliseconds. In order to successfully capture DTMF recognition for any of the thirty channels connected to a DSP, all thirty must be sampled within the 16 millisecond time frame. Thus, in order to ensure reliable capture of all DTMF recognitions within the line interface card, the microprocessor 38 must sample all 120 audio channels within each 16 millisecond time frame; and this represents a substantial computational requirement of the microprocessor 38.

Figure 5:
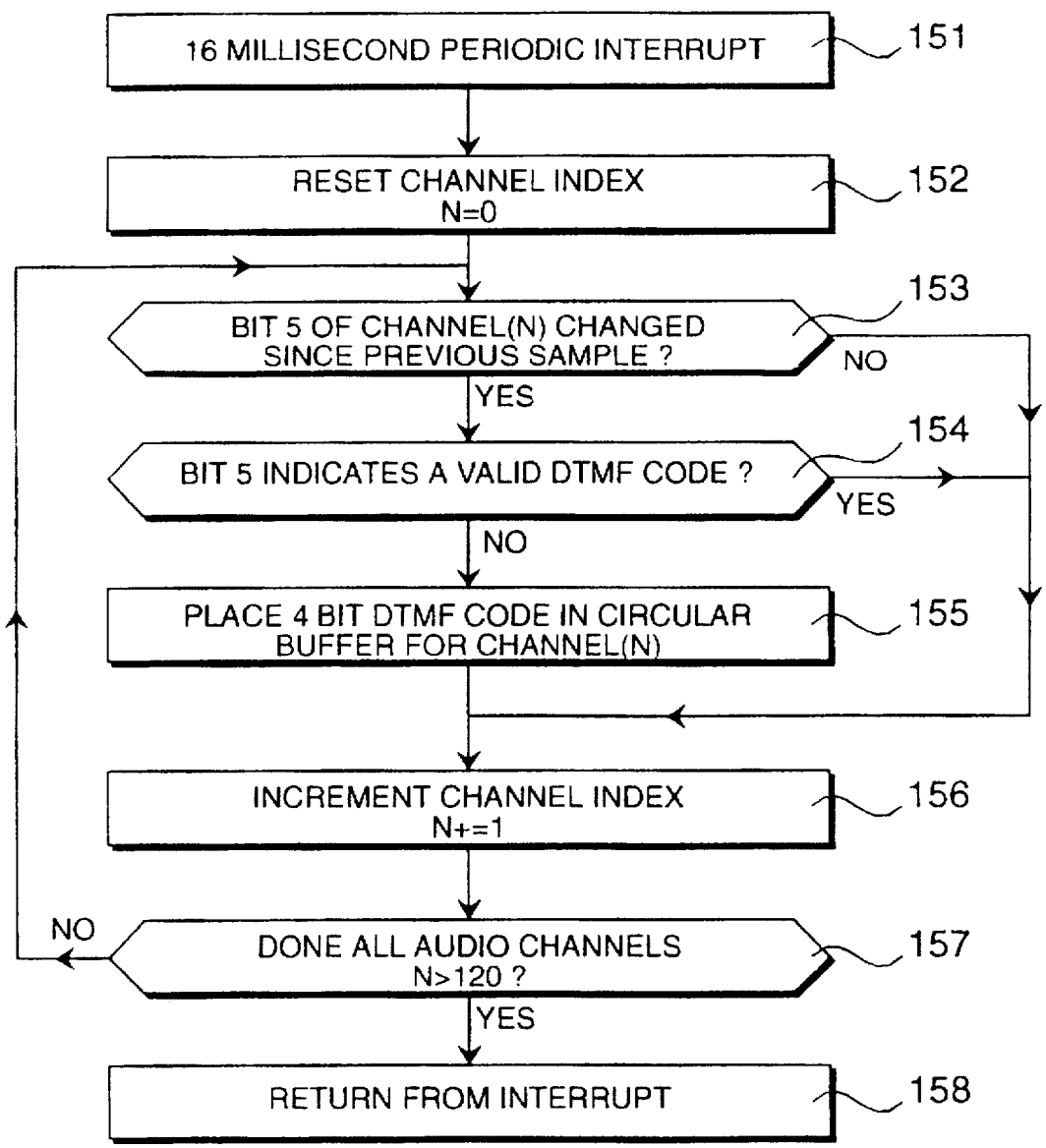
FIG. 5 details operations performed on the line interface card shown in FIG. 4; and, FIG. 6 details control operations for the service node.

In the preferred embodiment, each sample of an output channel from a DSP is placed into a circular buffer according to the rules defined in the flowchart shown in FIG. 5. Thus, although the intensive task of sampling all the audio channels is performed at the required rate, the processing of the resulting data may be performed over a longer time period by more complex software. The flowchart in FIG. 5 details the operations of an interrupt routine running on the microprocessor 38 which is called at sixteen millisecond intervals. Thus, regardless of whatever functions the microprocessor is otherwise doing, this routine will be called every sixteen milliseconds.

Step 151 signifies the generation of the sixteen millisecond periodic interrupt, which will force the microprocessor 38 to suspend other operations and execute the interrupt routine. At step 152 the channel index N is reset to zero. The channel index will be used subsequently to define access to a particular channel within the cross point switch 47 which is used to convey data from a channel output from a DSP. The channel index is also used to access the circular buffer and other memory locations within the 286 microprocessor system 38 which are associated with a particular audio channel.

At step 153 bit 5, the validation bit, of channel(N) is compared with its previously recorded value to see if it has changed. If bit five is unchanged, the other four bits of the DTMF recognition code are either valid or invalid. Either way, no actions needs to be taken for the current channel. However, if bit five has changed, step 154 decides whether bit five indicates a valid or an invalid signal. If bit five indicates an invalid signal, a valid recognised DTMF tone has just ended and step 155 may place the previously valid four bit DTMF recognition code into a circular buffer for the current channel. In other words, valid DTMF tones are only recorded by the microprocessor 38 at the end of their duration. A circular buffer is one where a number of memory locations, for example 64, is indexed by a counter which automatically increments every time a data item is written into the location which is indexed by it. The counter has the property that only a pre-defined number of bits are used for the index, so that incrementing the counter beyond 63 is impossible. Thus, computational overhead and memory are saved. The disadvantage is that another counter must be used to read out values from data locations within the buffer before it is overtaken by the buffer input counter. A suitable size for the circular buffer may be defined, such that, given a set of reasonable operating conditions, it is extremely unlikely for this to happen.

In the event that step 154 decides that bit five indicates the presence of a valid tone, no significant action need be taken.

Step 156 increments the channel index N, so that the steps 153, 154 and 155 may operate similarly on data associated with the next channel. Before doing so, however, step 157 ensures that there are still audio channels to be processed. If there are some left (N is less than 120) control is returned to step 153. If all 120 audio channels have been sampled, control is returned to the process which was being executed at the time the interrupt was called.

The interrupt routine shown in FIG. 5 represents a highly efficient way of sampling, interrogating and storing DTMF recognition codes from a large number of channels in real time using a microprocessor 38.

Once DTMF codes have been stored in circular buffers, the microprocessor 38 may analyze the stored codes to see if the pattern of codes meets conditions defined by a scan pattern. Thus the microprocessor 38 on the line interface card is able to record and match DTMF patterns against a scan pattern provided to it by the microprocessor 33 in the switch shelf, which has received the scan pattern and associated control instructions from the control computer 24. Furthermore, the scan pattern may specify a range of possible conditions, so that the microprocessor 38 may recognise a variety of incoming DTMF code patterns as meeting the required conditions, rather than simply searching for an identical match between a pattern and incoming DTMF codes. Thus a limited form of pattern recognition may be performed by the line interface card processor 38.

Figure 6:
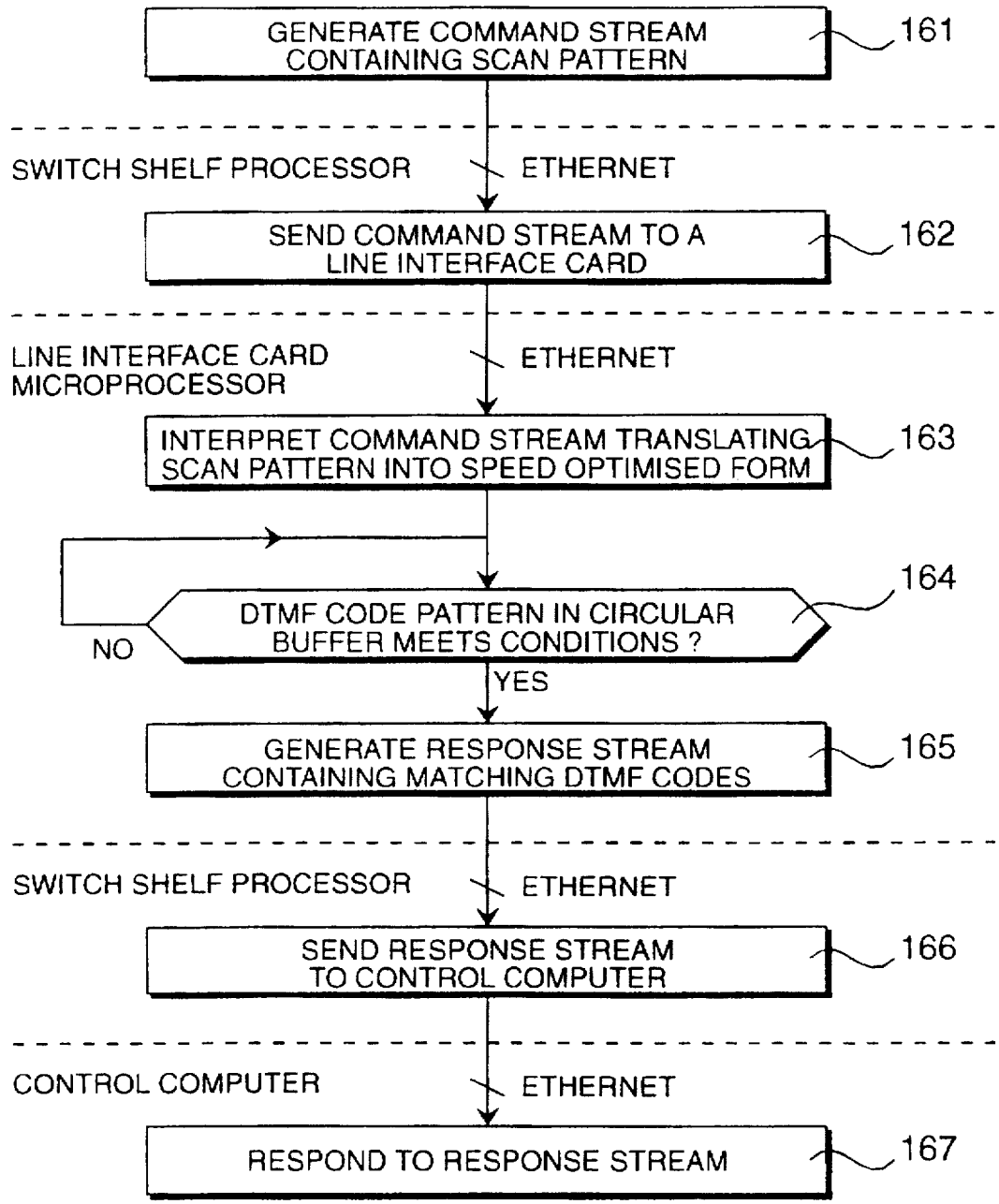

The procedure shown in FIG. 6 outlines the operations performed in different parts of the service node in order to set up and respond to a DTMF scan pattern. At step 161 the control computer generates a command stream for a particular customer call. The command stream includes the scan pattern, which is an embedded string of characters. These characters define the set of conditions which an incoming DTMF sequence from the customer must satisfy before said sequence is considered to match a particular pattern. The format of the scan pattern is described later. The command stream is passed over the ethernet interface to the switch shelf microprocessor 33. At step 162 the switch shelf microprocessor 33 redirects the command stream, again over the ethernet, to a line interface card.

At step 163 the line interface card microprocessor 38 interprets the command, deriving signalling information such as the channel number from the command stream.

Also at step 163 the microprocessor 38 translates the scan string into a different format in order to provide maximum speed efficiency during the process of attempting to match a DTMF code sequence, which occurs at step 164. At step 164, the DTMF codes stored in the circular buffer associated with the customers channel are compared with the speed-efficient scan pattern to determine whether the conditions are met. If these conditions are not met, step 164 loops back to its beginning again.

When a DTMF sequence in the circular buffer matches a scan pattern, control is diverted to step 165, where the line card microprocessor 38 generates a response stream, including the matching DTMF sequence. The response stream is sent over the ethernet 20 to the switch shelf microprocessor 33, which at step 166 directs the response stream to the control computer 24 over the ethernet. At step 167 the control computer uses the information contained in the response stream to direct further actions that are required to complete the customer service.

The control computer 24, having sent a command stream to the switch shelf, may return to other tasks until the remote processors send back a positive response stream. Thus, sophisticated DTMF pattern matching is provided without the danger of computational resources being overwhelmed by a coincidence of numbers of callers requiring a similar service at the same time.

As described previously, the control computer sends a command stream containing a scan pattern defining the conditions for a positive match. This scan pattern is a string of characters in a relatively legible format to aid service software writing and debugging. The format includes specifiers, and is defined in the following way:

A constant specifier may be used to define specific matching characters. A constant specifier may be 0 through 9, A through D, # or *. An example of this is "##22", which requires a customer generated DTMF sequence of "##22" to achieve a positive match-it must be identical.

An equal specifier defines that the DTMF incoming character must be the same as the one which preceded it. For example "#=2=" requires "##22".

A variable specifier follows the form %{n.{m}}p. Where p is one of "a", "n", "m" or "|digits|".

"a" specifies any DTMF digit.

"n" specifies any numeric DTMF digit 0–9.

"m" specifies any numeric digits terminated by #.

"|digits|" specifies any DTMF digit in the string "digits", except when the first character is a ^, in which case it specifies any DTMF digit except those in the rest of the string.

The optional value n (as in %{n.{m}}p.) can be used to specify detection of a fixed number of digits. If only n is specified as the template string, a match is always made on entry of the nth DTMF digit by the caller. The optional value m (as in %{n.{m}}p.) can be used to specify a maximum number of DTMF digits to be input by the customer.

For example "%5 m" is matched if an input of 5 numeric digits terminated by a "#" are detected.

"%3.5 m" is matched if an input of 3 to 5 numeric DTMF digits terminated by a "#" are detected.

"%1|123|" is matched if a single DTMF digit "1", "2" or "3" is detected.

"#=%1|123|=" is matched by the patterns "##11", "##22" or "##33".

In addition to the above methods of specification, a logical OR character (¦) may be used to specify a plurality of matching conditions, such that only one of the conditions contained within the string need be met to achieve a positive match. This character is represented on some computers as a single horizontal line (without the usual embellishments associated with letter I or numeral 1), shown herein as "¦", and has the ASCII value 124.

Thus using the logical OR character a template definition may be constructed thus:

"#=%1[123]=¦*%1[12345]¦%10.20 m¦%1[^0]"

which enables the customer to generate one of four different possible types of response. Whichever response the customer generates will be passed back to the control computer in the response stream, and thus the control computer 24 may initiate one of four different possible responses to the customer's DTMF sequence. In this way an intelligent dialogue may be built up with the caller, so that the caller may navigate through a menu driven service.

In the command string generated by the control computer, variables and flags are provided to define various aspects of the process of DTMF pattern recognition. Two variables, known as "first_dig_to" and "inter_dig_to", define the maximum time before a first digit is received and the maximum time between subsequent digits respectively. When inter_dig_to is exceeded, the DTMF codes may be successfully matched against scan patterns defining a "#" as the last digit, even if this has not been provided by the caller. When first_dig_to is exceeded, the operation is defined by the CONTINUOUS_SCAN flag defined below. The flags included in the command string are:

CLEAR_BUFFER—Causes any previously detected but unchecked DTMF digits to be discarded on initiation of additional pattern recognitions.

FIRST_DIGIT_NOTIFY—Causes the line card interface microprocessor 38 to generate a response stream on receipt of the first DTMF digit code after a pattern recognition has been initiated.

CONTINUOUS SCAN—Causes the operation to restart automatically either after a successful pattern match, or after the time out defined by the "first_dig_to" has been exceeded.

Thus a command stream for initiating a DTMF pattern recognition includes a template specification string, variables and flags, and associated channel, and service identification data. A response stream from the line interface card microprocessor 38 assigned the task will include the actual DTMF codes matching the scan string string, and associated channel and service identification data, so that the control processor may associate the response stream with the original command string and a particular service for a particular connected caller.

We claim:

1. In a telephony network, a service node comprising:
   a plurality of peripheral devices;
   switching means for connecting said peripheral devices to external communication means; and
   control processing means;
   said switching means having distributed processing means responsive to externally originating signals,
   said distributed processing means being arranged to supply information derived from said signals to said control processing means,
   wherein said control processing means is arranged to generate a representation of a scan pattern suppliable to said distributed processing means, and
   wherein said distributed processing means is arranged to perform scan recognition in response to said received pattern.

2. A service node according to claim 1, wherein said distributed processing means include
   at least one of a first type of processing means arranged to produce an indication of a detected signal; and
   a second type of processing means arranged to receive indications from said at least one first type of processing means.

3. A service node as in claim 2, wherein:
   said first type of processing means provides an indication of frequency components contained within said externally originating signals.

4. A service node as in claim 3, wherein said frequency components represent dual tone multi-frequency (DTMF) codes.

5. A service node as in claim 2 wherein said first type of processing means is a digital signal processor chip.

6. A service node as in claim 5, wherein each digital signal processor chip detects DTMF codes present on a plurality of multiplexed channels.

7. In a telephony network, a service node comprising:
   a plurality of peripheral devices;
   switching means for connecting said peripheral devices to external communication means; and
   control processing means;
   said switching means having distributed processing means responsive to externally originating signals,
   said distributed processing means being arranged to supply information derived from said signals to said control processing means;
   said distributed processing means including
   at least one of a first type of processing means arranged to produce an indication of a detected signal; and
   a second type of processing means arranged to receive indications from said at least one first type of processing means;
   wherein said first type of processing means provides an indication of frequency components contained within said externally originating signals; and
   wherein said second type of processing means matches said indications against a predetermined pattern to generate said information suppliable to the control processing means.

8. A service node as in claim 7, wherein said second type of processing means is a microprocessor.

9. A service node as in claim 8, wherein said second type of processing means is arranged to receive said indications from a plurality of said first type of processing means.

10. A service node according to claim 9, wherein said second type of processing means receives signals from said first type of processor means via a switching matrix.

11. A service node as in claim 10, wherein the microprocessor receives said indications by polling memory mapped locations over an interface, wherein said interface is also arranged to allow said microprocessor to configure the switching matrix.

12. A service node as in claim 11, wherein said switching matrix is polled periodically in response to microprocessor interrupts.

13. A service node as in claim 1, wherein said control processing means generates a representation of a scan pattern defining a range of acceptable patterns of received externally originating signals.

14. A network as in claim 1, wherein said service node is connected to a public switched telephone network.

15. A service node as in claim 1, wherein one of said peripheral devices is a speech applications platform for providing voice menu services.

16. A service node as in claim 1, wherein one of said peripheral devices is arranged to provide common access to pre-recorded service messages.

17. A service node as in claim 1, wherein one of said peripheral devices is arranged to record incoming customer voice signals.

18. A service node as in claim 1, wherein said switching means includes means for switching a plurality of digitally encoded speech signals.

19. A service node as in claim 18, wherein said switching means is arranged to switch a plurality of thirty channel time multiplexed signals.

20. A method of processing predetermined externally originating signals at a service node connectable to a telephony network, said method comprising steps of:

defining on a control processing means a plurality of scan patterns representative of respective sequences of signals, downloading said scan patterns to distributed processing means distributed in a switching means, and detecting with said distributed processing means a match between a sequence of externally originating signals and said scan patterns and returning to a control processing means a corresponding signal representative of a particular scan pattern which matched said sequence of externally originating signals.

21. A method as in claim 20, wherein said externally originating signals are customer-originating DTMF tones representing character codes.

22. A method for processing predetermined externally originating signals at a service node connectable to a telephony network, said method comprising steps of:

defining a scan pattern on a control processing means, and downloading said scan pattern to distributed processing means distributed in a switching means, wherein said distributed processing means supplies information indicating a match against received signals back to said control processing means, wherein said externally originating signals are customer-originating DTMF tones representing character codes, and wherein a scan pattern comprises at least one specifier defining a sequence of plural DTMF tones.

23. A method as in claim 22, wherein one of said specifiers is a constant specifier for specifying specific matching DTMF codes.

24. A method as in claim 22, wherein one of said specifiers is a variable specifier for defining a range of matching DTMF codes.

25. A method as in claim 22, wherein one of said specifiers is an equals specifier for defining a matching character code as being equal to a preceding matching character code.

26. A method as in claim 22, wherein one of said specifiers is a logical or specifier, allowing other specifiers to be combined in a logical sequence of matching DTMF codes.

27. A method processing predetermined externally originating signals at a service node connectable to a telephony network, said method comprising steps of:

defining a scan pattern on a control processing means, and downloading said scan pattern to distributed processing means distributed in a switching means, wherein said distributed processing means supplies information indicating a match against received signals back to said control processing means, and wherein said distributed processing means converts received signals into character codes using a first type of distributed processing means, and matches said converted codes against said scan pattern using a second type of processing means.

28. A method as in claim 27, wherein:

said conversion step includes processing said externally originating signals from a time domain to a frequency domain and detecting DTMF tones in said frequency domain to produce converted codes.

29. A method as in claim 27, wherein said matching step comprises matching a plurality of converted codes generated by a plurality of conversion steps converting signals in parallel.

30. A telephony network service node comprising:

a plurality of telephony service-providing peripheral devices connected to a telephony network via switch circuits controlled by a service node control processor, said switch circuits including distributed digital signal processing and programmable computing circuits connected by control and data transfer busses to said central processor, said distributed programmable computing circuits being programmed by down-loaded data from the central processor to detect thus designated patterns of sequential incoming signals from the telephony network and to communicate a representation of a particular thus designated incoming sequential signal pattern to the central processor upon its detection.

31. A method of operating a telephony network service node, said method comprising:

connecting a plurality of telephony service-providing peripheral devices to a telephony network via switch circuits controlled by a service node control processor, providing said switch circuits with distributed digital signal processing and programmable computing circuits connected by control and data transfer busses to said central processor, down-loading data from the central processor to each of the distributed programmable computing circuits to cause detection of thus designated patterns of sequential incoming signals from the telephony network and to communicate a representation of a particular thus designated incoming sequential signal pattern to the central processor upon its detection.

* * * * *